US006472842B1

(12) United States Patent
Ehsani

(10) Patent No.: US 6,472,842 B1
(45) Date of Patent: Oct. 29, 2002

(54) SELF-TUNING CONTROL OF SWITCHED-RELUCTANCE MOTOR DRIVE SYSTEM

(75) Inventor: Mehrdad Ehsani, Bryan, TX (US)

(73) Assignee: The Texas A&M University System, College Station, TX (US)

( * ) Notice: Subject to any disclaimer, the term of this patent is extended or adjusted under 35 U.S.C. 154(b) by 0 days.

(21) Appl. No.: 09/649,328

(22) Filed: Aug. 28, 2000

Related U.S. Application Data

(63) Continuation of application No. 09/165,539, filed on Oct. 2, 1998, now abandoned.
(60) Provisional application No. 60/061,087, filed on Oct. 3, 1997.

(51) Int. Cl.[7] .............................. H02P 1/46; H02P 3/18; H02P 5/28; H02P 7/36
(52) U.S. Cl. ........................ 318/701; 318/798; 318/806
(58) Field of Search ................................ 318/138, 139, 318/245, 254, 439, 685, 696, 687, 701–710, 479, 661, 639, 647, 650, 652, 605, 717, 798–806

(56) References Cited

U.S. PATENT DOCUMENTS

| | | | | |
|---|---|---|---|---|
| 4,933,620 A | * | 6/1990 | MacMinn et al. | 318/696 |
| 5,012,172 A | * | 4/1991 | Sember | 318/696 |
| 5,072,166 A | * | 12/1991 | Ehsani | 318/696 |
| 5,168,202 A | | 12/1992 | Bradshaw et al. | |
| 5,196,775 A | * | 3/1993 | Harris et al. | 318/638 |
| 5,291,115 A | * | 3/1994 | Ehsani | 318/701 |
| 5,410,235 A | * | 4/1995 | Ehsani | 318/701 |
| 5,448,149 A | * | 9/1995 | Ehsani et al. | 318/701 |
| 5,677,607 A | * | 10/1997 | Sugiyama et al. | 318/439 |
| 5,789,893 A | * | 8/1998 | Watkins | 318/710 |
| 5,841,262 A | * | 11/1998 | Tang | 318/701 |
| 5,896,020 A | * | 4/1999 | Pyo | 318/254 |
| 5,936,377 A | | 8/1999 | Blaschke et al. | 318/807 |
| 5,977,740 A | * | 11/1999 | McCann | 318/254 |
| 6,005,362 A | * | 12/1999 | Enjeti et al. | 318/479 |
| 6,008,601 A | * | 12/1999 | Sugiyama | 318/254 |
| 6,011,377 A | * | 1/2000 | Heglund et al. | 318/701 |
| 6,157,160 A | * | 12/2000 | Okawa et al. | 318/701 |
| 6,285,148 B1 | * | 9/2001 | Sugiyama | 318/432 |

OTHER PUBLICATIONS

Piyush Tandon, Anandan Velayutham Rajarathnam, and Mehrdad Ehsani, "Self–Tuning Control of a Switched–Reluctance Motor Drive with Shaft Position Sensor," *IEEE Transactions on Industry Applications*, vol. 33, No. 4, Jul./Aug. 1997.*
A.V. Rajarathnam, B. Fahimi, M. Ehsani, "Neural Network Based Self–Tuning Control of a Switched Reluctance Motor Drive to Maximize Torque Per Ampere," *IEEE Industry Application Society (IAS)*, Annual Meeting, New Orleans, Louisiana, Oct. 5–9, 1997.*
B. Fahimi, G. Suresh, J.P. Johnson, M. Ehsani, M. Arefeen, I. Panahi, "Self–Tuning Control of Switched Reluctance Motors for Optimized Torque per Ampere at all Operating Points," *IEEE Applied Power Electronics Conference (APEC)*, Feb. 1998.*

(List continued on next page.)

*Primary Examiner*—Robert E. Nappi
*Assistant Examiner*—Edgardo San Martin
(74) *Attorney, Agent, or Firm*—Baker Botts L.L.P.

(57) ABSTRACT

A system and method for controlling a switched-reluctance motor, in which a control variable is selected for controlling a figure of merit of the motor. The motor is then operated at a first value of the control variable. The control variable is adjusted to a second value, and the motor is operated at the second value of the control variable. A first indicator indicative of the figure of merit of the motor operating at the first value of the control variable is compared to a second indicator indicative of the figure of merit of the motor operating at the second value of the control variable. Thereafter, a new value is selected as the first value of the control variable in response to the comparison of the first indicator first to the second indicator.

24 Claims, 9 Drawing Sheets

OTHER PUBLICATIONS

A.V. Rajarathnam, B. Fahimi, G. Suresh, M. Ehsani, "Self-Tuning Control of Switched Reluctance Motors—The Next Critical Step in Commercial Application," *International Conference on Electrical Machines (ICEM)*, Aug. 1998.*

M. Ehsani, A.V. Rajarathnam, B. Fahimi, G. Suresh, "DSP Based Self–Tuning Control of Switched Reluctance Motors for Commercial Applications," *Texas Instruments Annual Meeting*, DSPS Fest, Aug. 1998. *Power Electronics Conference (APEC)*, Feb. 1998.*

J. Garside, R. Brown, T. Tuchti, and X. Feng, "Modeling Torque in a Switched Reluctance Motor For Adaptive Control Purposes Using Self–Organizing Neural Networks," Marquette University, pp. 944–949 No Date.

L. Ben Amor, L. Dessaint, O. Akhrif and G. Oliver, "Adaptive Input–Output Linearization Of A Switched Reluctance Motor For Torque Control," Montreal, Canada, pp. 2155–2160 No Date.

M. Moallem and C. Ong, "Predicting The Steady–State Performance of a Switched Reluctance Machine," IEEE Trans. Magn., pp. 1087–1097, 1991.

P.Tandon, A. Rajarathnam, M. Ehsani, "Self–Tuning Control of a Switched Reluctance Motor Drive With Shaft Position Sensor," Texas A&M University, pp. 101–108, 1996.

P. Djaer, P. Nielsen, L. Anderson, and F. Blaabjerg, "A New Energy Optimizing Control Stategy for Switched Reluctance Motors," IEEE Trans. Magn., vol. 31, No. 5, pp. 1088–1095, Sep./Oct. 1995.

D. Torrey and J. Lang, "Optimal–efficiency excitation of variable–relutance motor drives," IEEE Proceedings–B, vol. 138, No. 1, Jan. 1991, pp. 1–14.

H. Lovatt and J. Stephenson, "Computer–optimised current waveforms for switched–reluctance motors," IEEE Proc., vol. 141, No. 2, 45–51, Mar. 1994.

R. Orthmann and H.P. Schoner, "Turn–off angle control of switched reluctance motors for optimum torque output," The European Power Electronics Associtation, 1993.

I. Husain and M. Ehsani, "Torque ripple minimization in switched reluctance motor drives by PWM current control," IEEE, 1994, Texas A&M University No Date.

B. Bose, T. Miller, P. Szczesny, and W. Bicknell, "Microcumputer control of switched reluctance motor," IEEE Trans., vol. IA–22, No. 4, Jul./Aug. 1986, pp. 708–715.

* cited by examiner

SELF-TUNING CONTROL OF SWITCHED-RELUCTANCE MOTOR DRIVE SYSTEM

RELATED APPLICATIONS

This application is a continuation of U.S. application Ser. No. 09/165,539, filed on Oct. 2, 1998 under 35 U.S.C. §120, now abandoned, which claims priority from U.S. Provisional Application Ser. No. 60/061,087, filed Oct. 3, 1997 under 35 U.S.C. §119(e), the entire disclosures of both of which are incorporated herein by to reference.

TECHNICAL FIELD OF THE INVENTION

The present invention relates in general to the field of electronic systems and, more particularly, to the Self-Tuning Control method and system of a switched-reluctance motor drive.

BACKGROUND OF THE INVENTION

Due to the simple motor construction and power converter requirements, switched-reluctance motor ("SRM") drives have been found competitive with traditional ac and dc drives. However, the control of the SRM is not yet a perfected art. The controllable variables of the SRM are the phase current magnitude (I), the turn-on angle ($\alpha$), and the turn-off command angle ($\beta$) The control problem may be broadly divided into the following two questions.

(a) How does one determine the instants of time at which the motor reaches the desired switching angles of $\alpha$ and $\beta$?

(b) What are the optimal values of $\alpha$, $\beta$, I which satisfy the speed and torque demanded by the drive?

Problem (a) is usually solved by a shaft position sensor. This patent application addresses problem (b), assuming that position feedback data is available from a shaft sensor. The optimal performance of the drive may be described by different figures of merit, such as drive efficiency, torque per ampere ("TPA"), and torque ripple. Prior art publications describe the use of extensive computer simulations to demonstrate the possibility of obtaining maximum drive efficiency by means of controlling the firing angles, describe a use of optimal current waveforms for maximum torque per RMS ampere and analytically analyze the firing angle control for a maximum torque. The control strategies are usually based on a knowledge of the motor inductance profiles as a function of position. A reduction of torque ripple can also be achieved if this data is utilized. Conventionally, only simple control strategies have been implemented on actual SRM drives, such as a linear advance of the firing angles with increasing speed and load or a minimization of the conduction angle. There also has been an attempt to optimize drive efficiency on-line by varying the firing angles.

It has been realized that due to parameter variation and drift, the phase inductance profiles can significantly differ from the design data. Therefore, it may be preferable to use a controller with self-tuning capability if an optimal performance of the SRM drive is to be maintained.

The inherent simplicity, ruggedness, and low cost of a SRM make it a potential candidate for various general purpose adjustable speed applications.

However, a comprehensive mathematical modeling of SRM is extremely complicated due to its highly non-linear characteristics arising from its saturation region of operation. Several attempts have been made to derive a nonlinear mathematical model of the SRM. Attempts on linearization of the complicated nonlinear SRM model have also been made.

However, these conventional methods suffer from several limitations. For example, they use complex modeling and computation time, and they lack accuracy. The capability to accommodate accurate non-linear modeling has made Artificial Neural Networks ("ANNs") an ideal candidate to solve the control strategies of an inherently nonlinear system. A self organized Kohonen neural network has been previously provided for the modeling of nonlinear SRM torque characteristics as a function of position and current. A nonlinear modeling of SRM based on the back propagation neural network has also been discussed, as well as a torque ripple minimized control of SRM using ANNs. In all these prior art approaches, the neural net training is performed using static magnetization data which is generated experimentally. Although these neural networks trained with the static test data may perform well for the steady state operation, they fail to function adequately in the dynamic regime.

The main advantage of SRM is in its simple yet rugged rotor construction. Though it has a simple structure, its control is very complicated due to the highly nonlinear characteristics of the machine. The advances made in the field of Digital Signal Processors ("DSPs") can be utilized in developing advanced digital controllers which can handle complicated control strategies. Several control strategies have been developed to improve the performance of the SRM drives. The performance indices usually considered were maximum torque, torque ripple and drive efficiency. Prior publications on the optimization of the SRM drive performance consisted mainly of off-line calculations to find the excitation instances to optimize performance indices like efficiency and torque output. These control strategies are based on the assumption that there can be no occurrence of parameter variations that may change the electrical characteristics of the machine. However, significant SRM parameter variations occur in its mass production or with motor aging. Control techniques with self-tuning capability are essential to maintain an optimal performance of the SRM drive, in the presence of parameter variations. Prior publications indicate that parameter variations can alter the inductance profile to a significant extent. Since the control of the SRM is essentially based on the inductance profile, it necessitates an on-line self-tuning control strategy for optimum performance. Some work for an on-line optimization of the SRM drive efficiency and torque per ampere has been conducted. The prior art publications describe a self-tuning control method which takes into account the variations in the inductance profile due to parameter variations. But this conventional method only has a finite accuracy, a restricted self-learning capability and a limited dynamic response. Neural Networks ("NNs") have been successfully used for many applications in control systems. But the NN learning algorithm performs remarkably well when used off-line, i.e., it has to be fully trained before being applied. NNs with incremental learning capability with stable adaptation of network parameters are preferable for on-line adaptive control. Foslien et al. suggested a simple, model-independent method which is based on the assumption that the NN to start with is well trained in such a way that it can perform input/output mapping for the initial training set with high degree of accuracy. This can be achieved by training the NN with sufficient amount of data to a very low error rate. According to an exemplary embodiment of the present invention, this training can be done off-line as it may require more time. The present invention provides an improved control technique that overcomes the above-described shortcomings and optimizes the drive performance as measured by torque per ampere. With reference to the discussion provided below, torque per ampere is defined as the ratio of the average torque to the phase current amplitude.

SUMMARY OF THE INVENTION

In accordance with the present invention, a switched-reluctance motor drive system is provided that substantially reduces or eliminates problems associated with the prior systems.

One of the embodiments of the system and method according to the present invention solves the problem of obtaining optimal performance from the SRM motor in the presence of a parameter variation, which can alter the phase inductance profiles. The operation of an SRM drive in the controlled current mode from zero to base speed can be considered. A shaft position sensor may be utilized for commutation of the power converter. Self-tuning methods according to the present invention which optimize the steady-state performance of the drive as measured by TPA can also be utilized. Computer simulations can also be employed to show the existence and uniqueness of a solution to the optimal TPA problem.

In another embodiment of the present invention, the drive performance is optimized as measured by torque per ampere. One exemplary variant of the method according to the present invention utilizes the ANN's, which uses control and heuristic search based on position and current feedback, to constantly update the weights of NN in accordance with the parameter variations. Since NN can be trained based on the experimental data obtained from the self-tuning setup which includes the effect of saturation, it may have a very good accuracy. In addition, it offers a good dynamic response and has an excellent self-learning capability. Experimental results are provided which demonstrate an exemplary operation of the self-tuning controller.

Another embodiment of the method according to the present invention provides an ANN based control method for maximizing torque per ampere figure of merit presented. This embodiment is highly accurate, robust and has a good dynamic response, and combines the ANN based control and a procedure of a periodic search for an optimal turn-off angle based on the position of the motor and the current feedback. This method has a self-learning capability as it tunes the weights of the ANN according to parameter variations that affect the inductance profile. This method can be implemented digitally using, e.g., a digital signal processor. This method can be made flexible to optimize new performance index on-line.

Yet another embodiment of the method according to the present invention combines the adaptive ANN based control with a heuristic search method which periodically updates the weights of the NN in accordance with the parameter variations. The NN is trained with the experimental data obtained from the heuristic search based self-tuning setup. Hence it may include the effect of saturation and has a very good accuracy. In addition, it offers a good dynamic response and has an excellent self-learning capability. The dynamic model of the SRM uses static magnetization data generated experimentally. The operation of the SRM from zero speed to the base speed can be considered.

An on-line self-tuning control is preferable to optimize the performance of the SRM drive in the presence of variable variations, and provides the advanced adaptive NN based control to maximize torque per ampere in the low speed region. The method according to the present invention utilizes a heuristic search method to find the change in the optimal excitation instances in case of variable variations.

Based on the results of such heuristic search, NN may utilize an incremental learning to adapt its network weights.

Another embodiment of the system and method according to the present invention provides a neural network based torque control method and system for controlling SRM to minimize torque pulsation with a maximum possible torque per ampere figure of merit. Depending on the torque demand, rotor position and rotor speed, the ANN generates optimal current profile to achieve the task. Unlike the other conventional NN based control schemes which use static test data for training, the NN based torque control system and method uses training data generated from a dynamic SRM model. Hence, the system and method control torque on an instantaneous basis rather than on an average basis, allowing an effective torque control with a maximum torque per ampere even during the transient operation of the motor. The effect of magnetic non-linearity in the dynamic SRM model may be taken into consideration by using, e.g., a static magnetization curve. The SRM operation from zero speed to the base speed can also be taken into consideration.

BRIEF DESCRIPTION OF THE DRAWINGS

A more complete understanding of the invention and its advantages will be apparent from the detailed description taken in conjunction with the accompanying drawings in which:

FIG. 5($b$) is a graph of the variation of average torque with firing angles.

FIG. 6($b$) is a second graph of optimized pulses shown in FIG. 6($a$).

FIG. 9($b$) is a graph of speed of the SRM during self tuning.

FIG. 11($b$) is a graph of an inductance profile of speed as a function of time.

DETAILED DESCRIPTION OF THE INVENTION

I. Self-Tuning Control of a Switched-Reluctance Motor Drive with Shaft Position Sensor.

CONTROL OF THE SWITCHED-RELUCTANCE MOTOR

Figure 1:
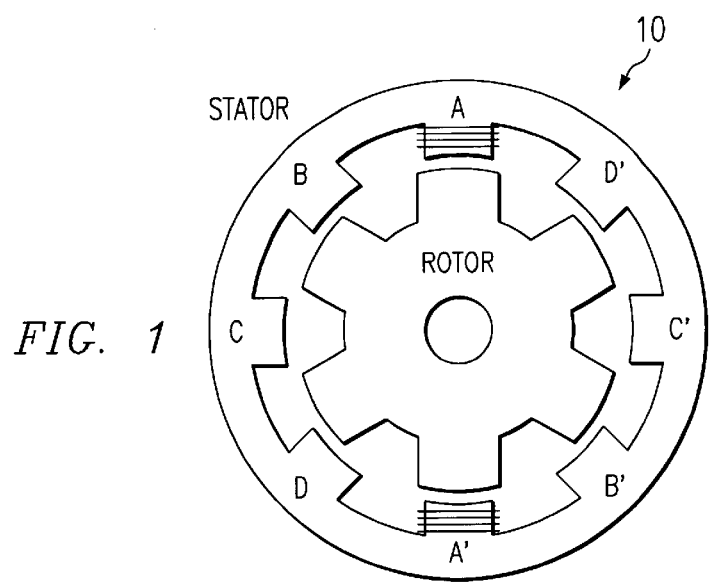
FIG. 1 is a diagram illustrating a conventional switched-reluctance motor ("SRM").
Figure 2:
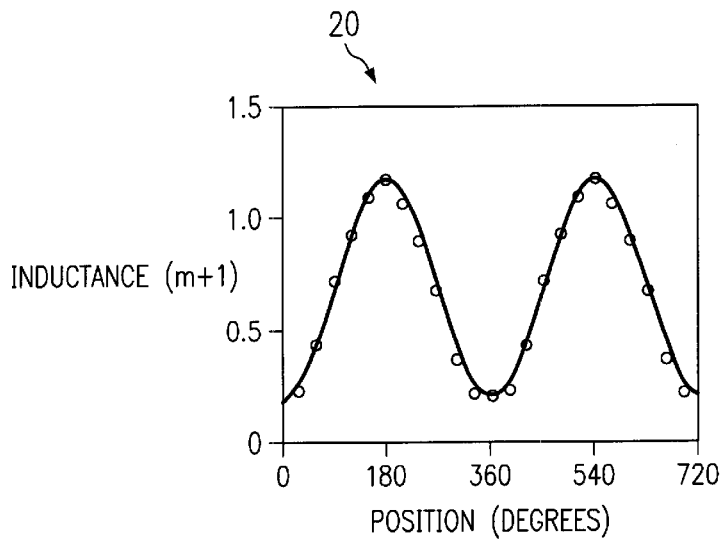
FIG. 2 is a graph illustrating a measured inductance profile of SRM.

In order to understand the system and method according to the present invention, it is beneficial to discuss a general control of the switched-reluctance motor. FIG. 1 shows the cross section of a conventional Switched-Reluctance Motor Drive (SRM) 10 with eight poles A, B, C, D, A', B', C', D' on the stator and six poles on the rotor. Due to the saliency on both rotor and stator, the inductance of each phase of the SRM 10 is a periodic and symmetrical function of the rotor position ($\theta$). FIG. 2 shows an exemplary measured inductance profile curve 20 for one phase of the SRM.

To simplify the analysis, the exemplary profile curve may be described by using the first two terms of a Fourier series approximation of the actual data:

$$L(\theta)=L_1-L_2*\cos(\theta), \quad (1)$$

where $\theta=0°$ corresponds to an unaligned position of the SRM, and to generalize the description for the SRM with any number of stator phases and rotor poles, $\theta$ can be defined to be the electrical angle such that one cycle of the phase inductance to equals 360°. Assuming the magnetic circuit is linear, the instantaneous torque t can be defined as:

$$\tau=½*i^2*dL/d\theta. \quad (2)$$

To produce a motoring torque, each phase may be excited during the rising portion of the inductance profile. An ideal excitation of the SRM is a rectangular pulse of current for $\theta$ from 0° to 180°. An average torque (T) is defined as $$T = \frac{1}{2\pi}\int_0^{2\pi} \tau d\theta. \quad (3)$$

Figure 3:
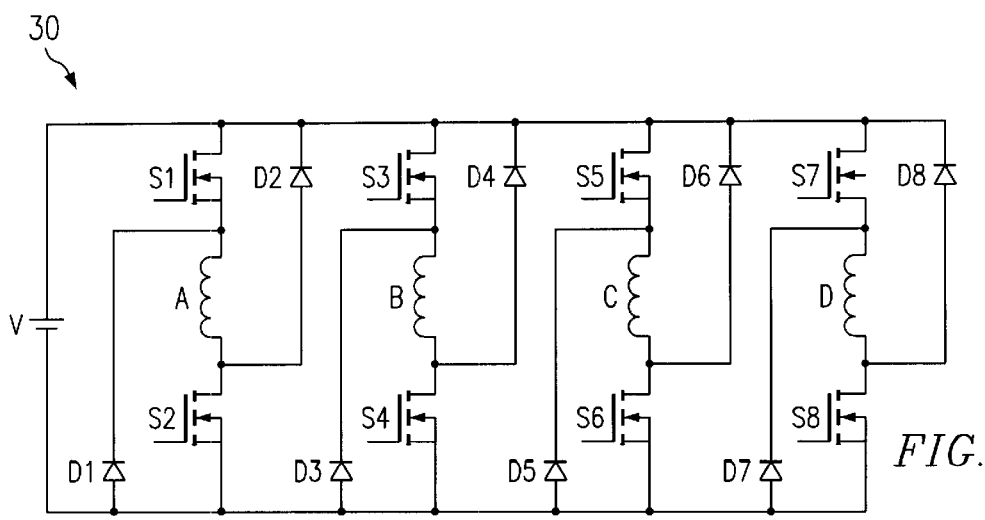
FIG. 3 is a diagram illustrating a power converter circuit.
Figure 4:
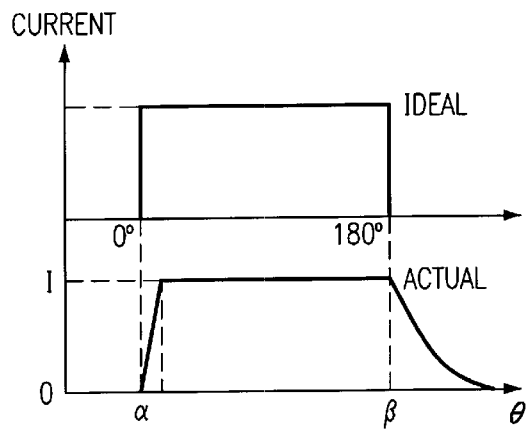
FIG. 4 is a diagram illustrating an ideal and actual current pulses.

In an operating region from zero to base speed, the motor back Electro-Motive Force EMF (or air gap voltage) is not sufficient to limit the current to acceptable values. Therefore, a current feedback can be used to implement a "bang-bang" or hysteresis-band chopping control, such that the phase current is regulated to the desired value. Since the chopping band is small (e.g., less than 10% of rated current) and the chopping frequency is generally high (e.g., 10 Khz), the effect of the chopping control is neglected in the ensuing analysis. FIG. 3 shows an exemplary power circuit 30 which can be used with the SRM 10. A voltage-source inverter topology is utilized in the power converter circuit 30 to allow for an independent control of the current in each phase. Due to the inductive nature of the circuit 30 and the rotational back EMF, the current pulse generally has finite rise and fall times, during which negative torque can be generated. FIG. 4 shows the ideal and actual current pulses of the current pulse.

According to the present invention, it is preferable to optimize a torque performance index "(TPA)" to focus on the motor performance. A drive efficiency may be dependent on a number of factors, including converter topology, switching frequency, and motor speed. A torque ripple can be troublesome in low-speed and precision control applications, and may not be possible to optimize all these indices simultaneously. A maximum TPA may be preferable for any drive application, because the SRM motor 10 may be described as a "current-to-torque transducer".

Because of the consideration of the operation of the SRM in the low-speed range, the phase current magnitude can be expressed by the current reference command ("I"). Thus, the TPA can be defined as:

$$TPA=T/I. \quad (4)$$

It is a well-known that an angular duration of the current rise and fall times increases with both the speed and current. Therefore, it is logical to analyze the motor operation at the rated speed (e.g., at 1800 r/min) and the rated phase current (e.g., at 20 A), where these effects may be most significant. To optimize the TPA, it is necessary to find the maximum torque at the given speed and current ($\omega$, I).

Figure 5A:
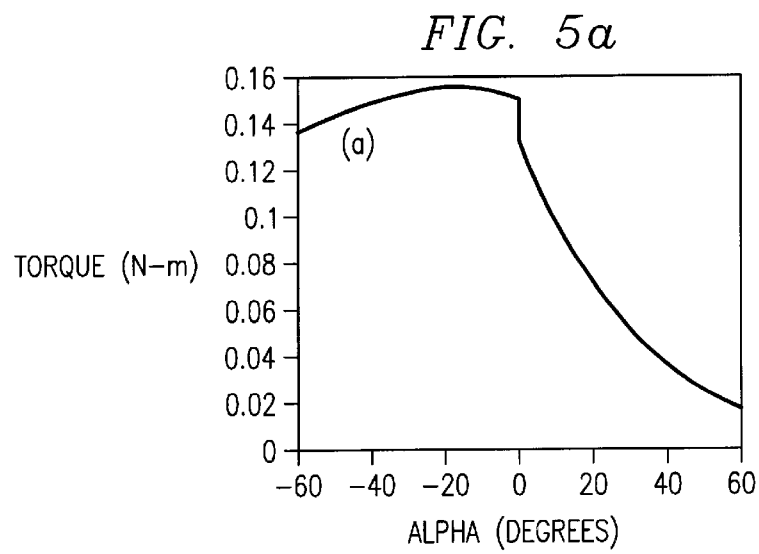
FIG. 5($a$) is a graph of the average torque as acis varied from $-60°$ to $+60°$.
Figure 5B:
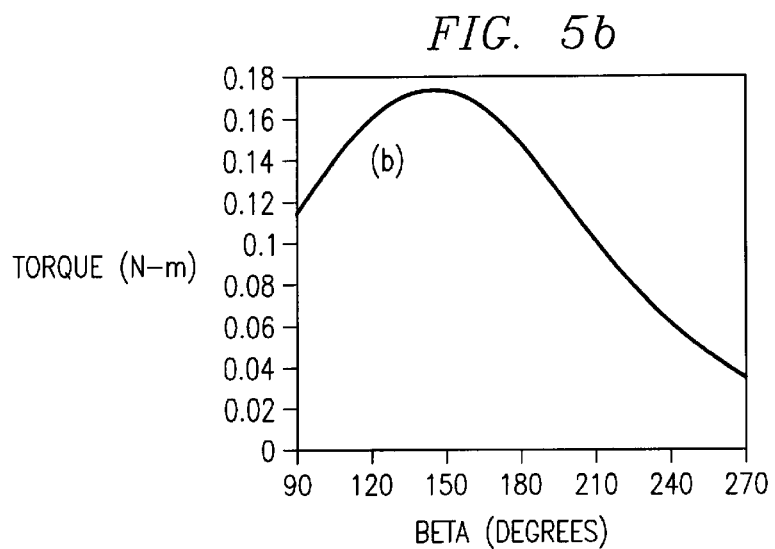
Figure 6A:
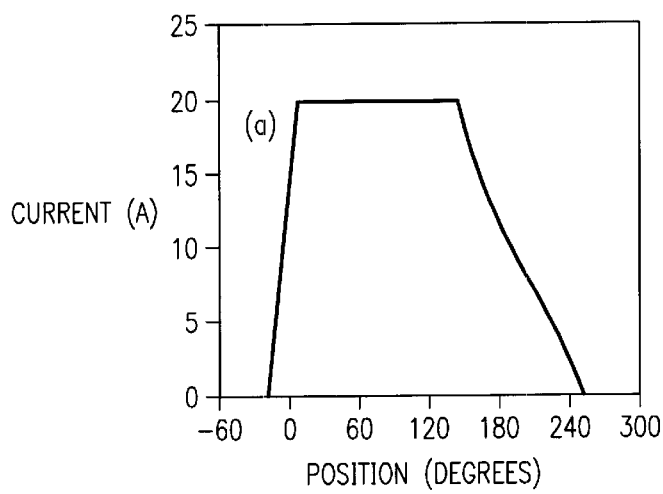
FIG. 6($a$) is a first graph of pulses at $\omega=1800$ r/min, $I=20$ A.
Figure 6B:
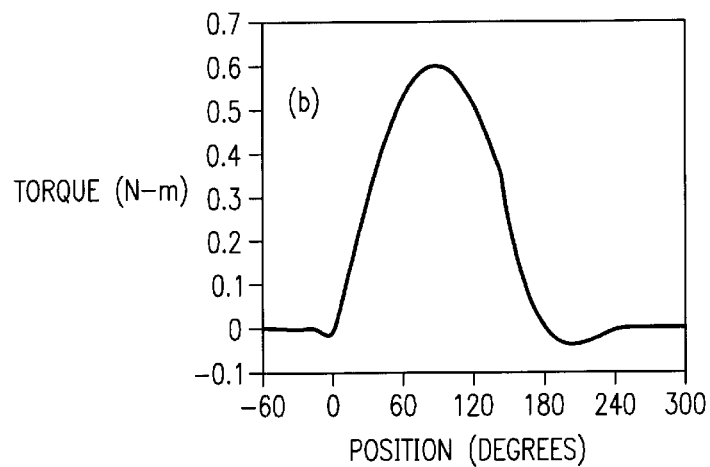

FIG. 5(a) is a plot of the average torque as $\alpha$ is varied from, e.g., −60° to +60°, and $\beta$ is fixed at 180°. The plot shows that a maximum may occur by advancing $\alpha$ from the unaligned position. The sharp decrease in torque for the values of $\alpha$ delayed beyond 0° occurs because, after some point, the current never reaches the set value. FIG. 5(b) shows the plot of T as $\beta$ is varied from, e.g., 90° to 270°. In this case, $\alpha$ is held constant at 0°. The plot has a maximum point at a value of $\beta$ in advance of the aligned position (e.g., at 180°). FIG. 6(a) shows an exemplary current waveform with the preferable values of $\alpha=−15°$ and $\beta=144°$. FIG. 6(b) shows a plot of the instantaneous torque corresponding to the optimized current pulse in FIG. 6(a). It should be noted that the maximum TPA can be achieved using an appropriate balance between the positive and negative torque produced by the current pulse. Denoting the optimal values of the firing angles as $\alpha$ and $\beta$ it can be shown that:

$$\alpha_{min}<\alpha<0°, \beta_{min}<\beta<180°. \quad (5)$$

where $\alpha$ is defined as the turn-on angle such that the current reaches the set value I exactly at a first angle, e.g., $\theta=0°$, and $\beta$ is defined as the turn-off command angle such that the current goes to zero substantially at a second angle, e.g., $\theta=180°$. Both $\alpha$ and $\beta$ may depend on the speed ($\omega$) and the value of the current (I). However, the inequalities provided in equation (5) may have hard limits by using the values of $\alpha$ and $\beta$ for the maximum current and speed. Due to the current control region, during which the current remains constant at I, it is possible to optimize $\alpha$ and $\beta$ separately. Table I provides an exemplary result of the optimization performed on the computer for two different speeds. It can be seen that the optimal advance for $\alpha$ and $\beta$ increases with both the speed and the current.

TABLE I

EXEMPLARY OPTIMAL VALUES OF $\alpha$ AND $\beta$ FOR MAXIMUM TPA

| $\omega$(rpm) | I(A) | $\alpha$ | $\beta$ |
|---|---|---|---|
| 600 | 10 | −3 | 172 |
| 600 | 12 | −4 | 171 |
| 600 | 14 | −4 | 170 |
| 600 | 16 | −5 | 169 |
| 600 | 18 | −6 | 168 |
| 600 | 20 | −6 | 167 |
| 1800 | 10 | −9 | 160 |

TABLE I-continued

EXEMPLARY OPTIMAL VALUES OF α
AND β FOR MAXIMUM TPA

| ω(rpm) | I(A) | α | β |
|---|---|---|---|
| 1800 | 12 | −10 | 156 |
| 1800 | 14 | −12 | 153 |
| 1800 | 16 | −14 | 150 |
| 1800 | 18 | −16 | 147 |
| 1800 | 20 | −18 | 144 |

Thus, the unique solution to the maximum TPA problem can be provided, within the feasible set defined by equation (5).

SELF-TUNING CONTROL

As indicated above, the optimal values for the firing angles can be determined using the model of the SRM. It is possible that the model based on the inductance profiles may not necessarily be an accurate representation of the electromagnetic states of the machine. Certain effects, such as the magnetic saturation, iron losses, and leakage flux do not have to be included in the calculation. Even if another model is utilized, off-line calculations generally do not account for effects such as parameter variation and parameter drift. Specifically, the following problems may arise in practical SRM's.

a. Due to manufacturing tolerances, the inductance profile can vary as much as 10% from phase to phase of the motor and, also, from motor to motor with the same design and rating. It can be noted that the minimum inductance does not show any significant variation (within 1%). This is due to the very large air gap at the unaligned position. However, the maximum inductance occurs at the aligned position where the air gap may be less than 1 mm. Therefore, minor variations in the air gap may appear in the maximum inductance. Thus, the slope of the inductance profiles will also differ, and the torque production is affected.

b. With time, there may be wear on the bearings, as a result of which, the air gap may change or acquire a small eccentricity. Again, this may have an impact on the maximum inductance of each phase.

These effects may change the value of the inductance at the aligned position (θ=180°), while the values of inductance around the unaligned position (θ=0°) are generally insensitive, due to the very large air gap. Hence, the optimal values of α calculated off-line are sufficient for the TPA maximization. However, the optimal values of β calculated off-line would no longer be valid for maximum TPA. An on-line, self-tuning method and system according to the present invention determines the optimal value of β in the presence of the parameter variations which alter the inductance profiles. One of the objectives of the self-tuning controller of the present invention is to optimize the steady-state performance of the SRM as measured by the TPA. In the generating regime, the roles of α and β can be swapped, i.e., α can become the turn-off angle and β can become the turn-on angle. It is important to note that α is associated with the L__min zone, while β is associated with the L__max zone. Therefore, the concepts of optimization with reference to α and β remain valid in all four quadrants.

Figure 7:
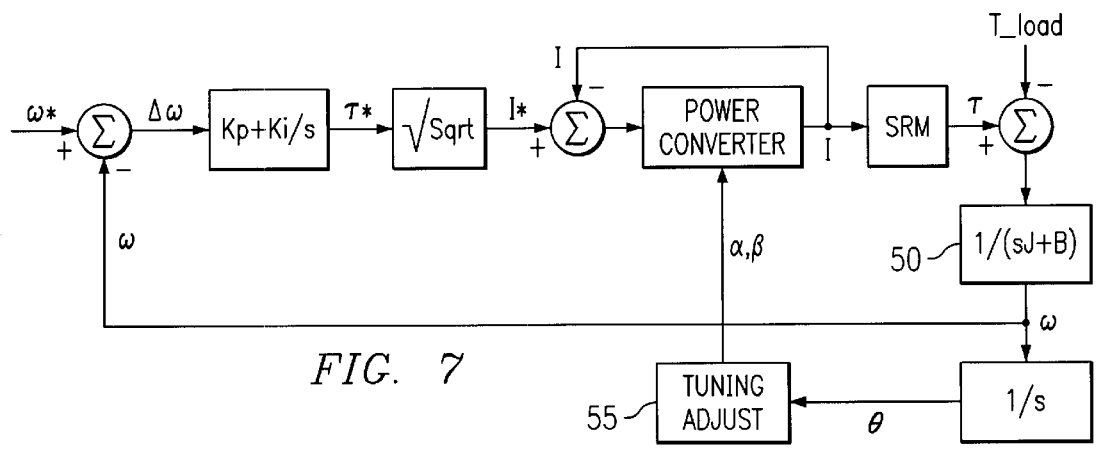
FIG. 7 is an exemplary embodiment of a speed-controlled drive system for controlling the SRM shown in FIG. 1.

FIG. 7 shows a speed-controlled drive system 50 according to the present invention. The current I is used to directly control the motor torque for the closed-loop speed control. The SRM transfer function is approximated by the equation $T=kI^2$. The firing angles α and β can be varied by the self-tuning control 55 (which may be speed-controlled or torque-controlled) to achieve the maximum TPA at the set speed and load torque. Thus, the problem may be defined as being able to determine the optimal angle set (α, β) such that the TPA is maximum at the desired operating point (ω, T) in the speed-torque plane.

Figure 8:
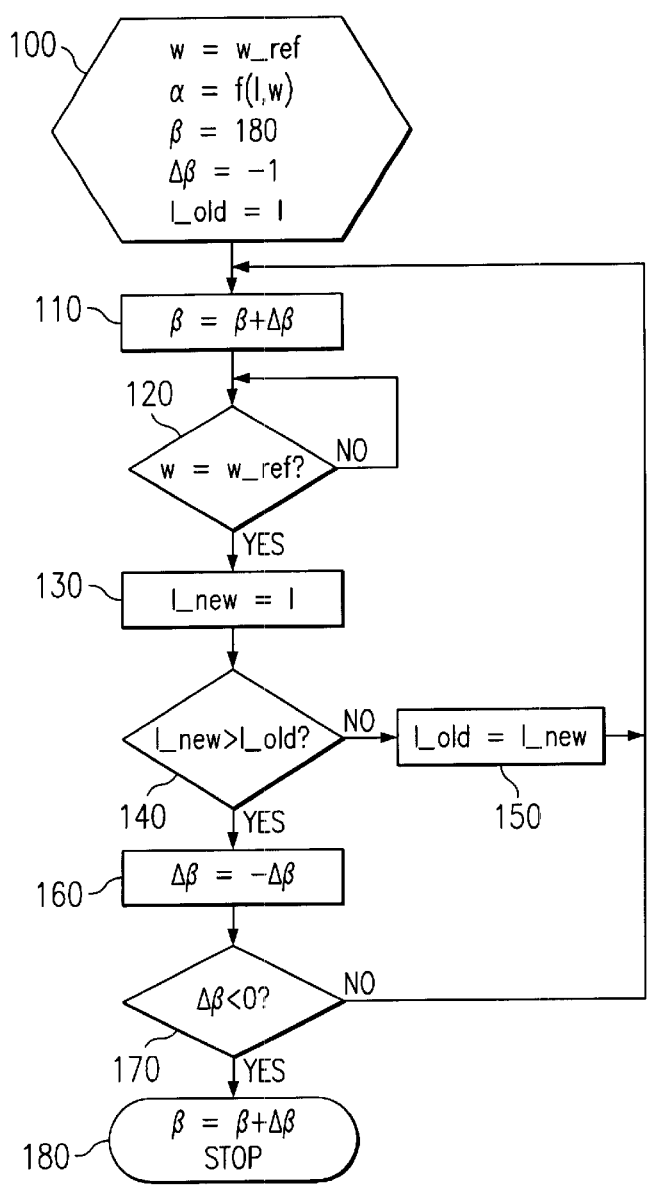
FIG. 8 is an exemplary flowchart of a self-tuning method according to the present invention.

One embodiment of the method according to the present invention for determining the optimal turn-off command angle β is shown in FIG. 8. The speed controller 55 starts its generating procedure at the desired operating point (ω, T) in the speed-torque plane. When the method determines that "steady state" has been achieved, the optimization algorithm can be initiated.

Initially, in step 100, the optimal turn-on command angle procedure α is read in from a look up table based on the current and speed. The initial value of β can be chosen as e.g., 180° because, as discussed above, β is generally provided before θ=180°. Δβ is a small change in angle (e.g., 1°) or, the step size for the search. After each change in β (step 110), the procedure waits until the speed returns to the set value (step 120). Because a change of the value of β either increases or decreases the torque, the speed controller may react by making a corresponding adjustment to the value of I. First the present current is set to be the new current (step 130). The new value of I is then measured and compared with the previous value (step 140). If the current has decreased ($i_{new} \leq i_{old}$) that indicates that the search is proceeding in the correct direction, i.e., the new current is provided as the old current (step 150) and the procedure continues to step 110. If not, the sign of Δβ is changed, i.e., the direction of search is reversed (step 160). If the check in step 170 is not included, the procedure converges on the optimal β and then oscillates indefinitely between two or three substantially similar values.

Hence, the procedure is terminated when it is determined in step 170 that Δβ is less then zero. The controller 55 can also limit the search to the feasible set (e.g., $β_1=180°$), as discussed above. Since the speed and torque remain constant, it is sufficient to minimize the current so as to achieve the maximum TPA.

For the duration of the above-described self-tuning procedure, it is preferable that the set speed and load torque remain substantially constant. If either one of these variables changes, it may be necessary to abort the self tuning procedure and reinitiate it when steady state is attained at a new operating point. The effect of any changes in the drive transients, e.g., an acceleration from one speed to another, can also be considered as step changes in load torque, etc. During the steady-state self-tuning process, the controller 55 changes the value of the firing angle (β), and then waits until the speed returns to the set value after the perturbation. The duration of such time depends primarily on the time constant $t_M$ of the closed-loop drive system (see FIG. 7). After each change in firing angles, it is preferable to wait for a time of approximately $4 \times t_M$ (e.g., settling time for 2% error), until a valid measurement of the current I can be made for a comparison with the previous value. If any kind of drive transient is considered, the entire duration would be $4 \times t_M$. This means that the self-tuning procedure wouldn't generally occur any faster than the response time of the drive. Thus, it is preferable to perform the self-tuning of the SRM while the drive system is moving from one state to another in the speed-torque plane. A maintenance of the maximum TPA during the dynamic regimes of the operation is preferable, because at such time, the maximum torque performance can be requested from the SRM.

According to the present invention, it is possible to improve the TPA performance of the drive during transients by using lookup tables for both angles α and β which are indexed with the current and speed. During the drive dynamics angles, α and β can be read from, e.g., Table I provided herein above as the current I and speed ω change. Initially, the optimal values calculated off-line can be stored in these tables. Then, the steady-state self-tuning procedure can be used to update the above described tables. Therefore, if the values in the table are sub-optimal due to incorrect modeling, parameter variations, or parameter drift, these values can be corrected by the self-tuning procedure according to the present invention. In a sense, the controller 55 of the present invention has a rudimentary "self-learning" capability such that the dynamic performance improves with time, and eventually reaches the optimal TPA for all operating points. Furthermore, the steady-state self-tuning procedure also converges faster, since the search is initiated at some sub-optimal value of β, which is likely to be closer to β* than β=180°.

Figure 9A:
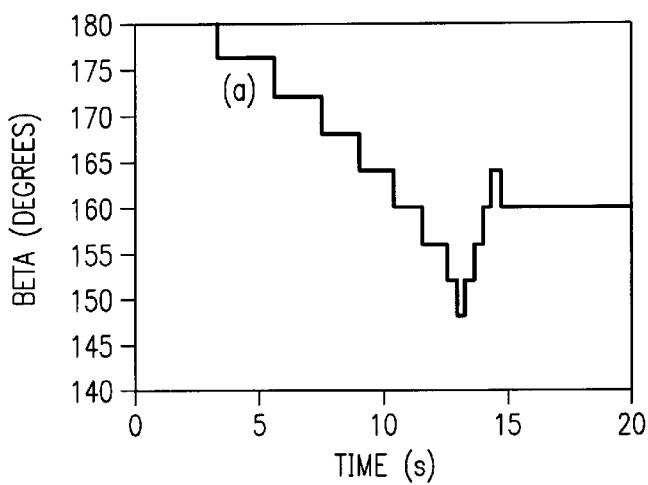
FIG. 9($a$) is a graph of variation of firing angle $\beta$.
Figure 9B:
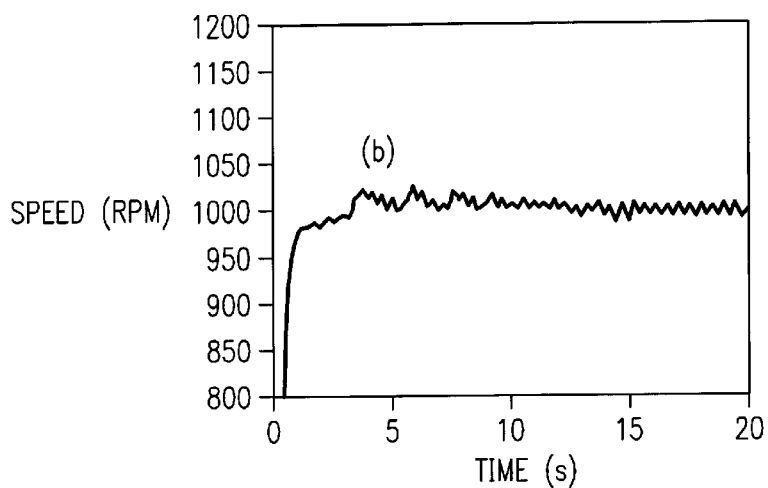
Figure 10:
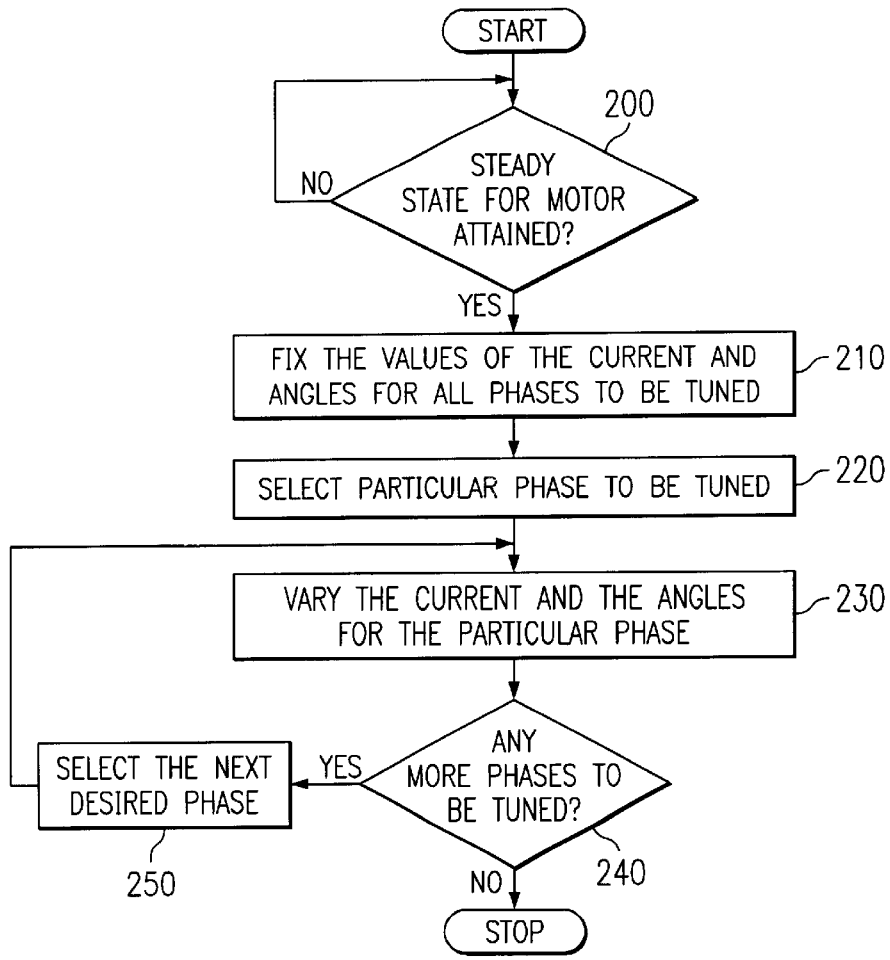
FIG. 10 shows a flow chart of another exemplary embodiment of the method according to the present invention.
Figure 11A:
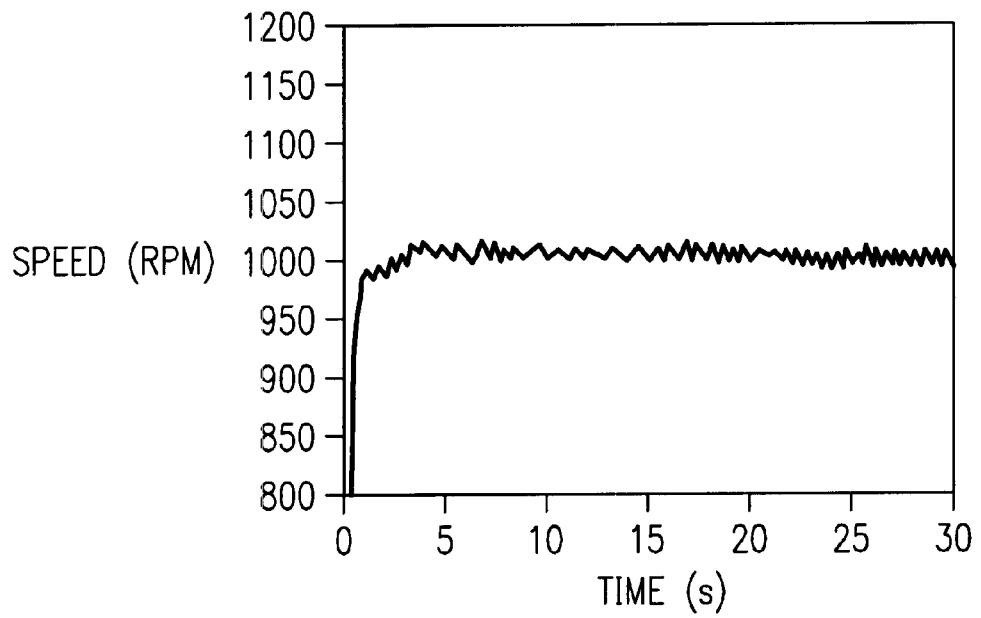
FIG. 11($a$) is a graph of a turn-off angle as a function of time.
Figure 11B:
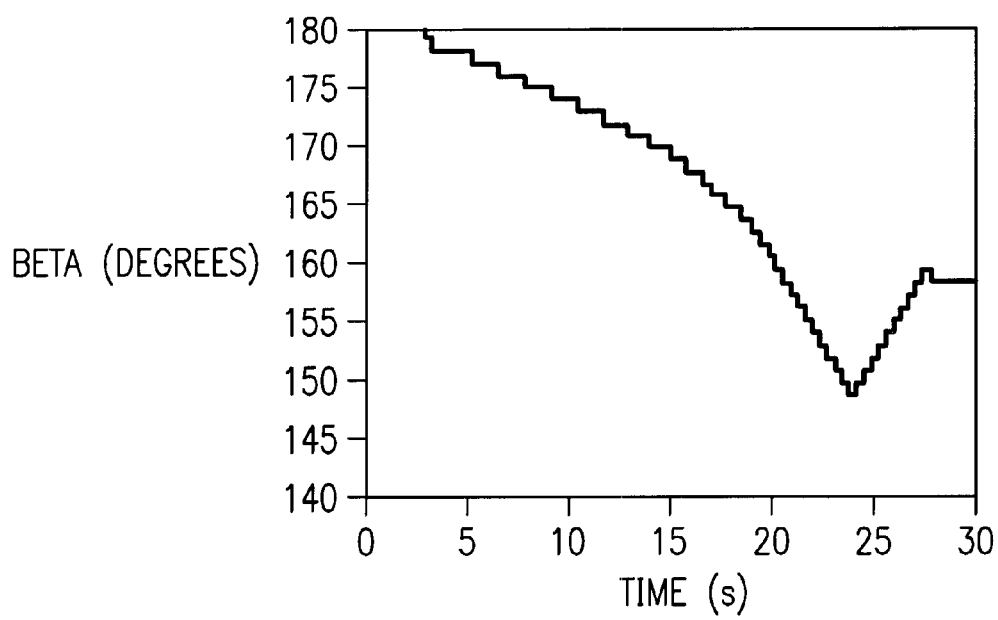

In some cases, there may be variations from phase to phase of the SRM, it is possible to perform the tuning one phase at a time. FIGS. 9(a) and 9(b) show graphs of the variations of firing angles and speed as a function of time. According to an exemplary embodiment of the method of the present invention shown in FIG. 10, it is first determined if the steady state has been attained (step 200). If not, the controller 55 waits until the steady state is attained. Once the steady state is attained, the values of I, α, β for all the phases except the one to be tuned are fixed (step 210). Then, a particular phase to be tuned is selected (step 220), and the speed controller varies I only for the phase being tuned and α, β are also varied only for that particular phase (step 230). In step 240, it is determined if any more phases are to be tuned. If not, this procedure determinates, otherwise the next desired phase is selected (step 250), and the processing returns to step 230. Thus, it is possible to detect the individual contribution of each phase to be the total motor torque, and hence maximize the TPA for each phase.

The results of such steady state, e.g., self-tuning procedure is described in U.S. patent application Ser. No. 09/165,539, which is now abandoned.

According to the present invention, the time which is utilized for one electrical cycle (x) depends primarily on the speed (ω) (revolutions per second) and the number of the rotor poles ($\rho_R$):

$$t_E = 1/(\rho_R * \omega). \quad (6)$$

After any change in the firing angles, one electrical cycle may elapse before the change in average torque can be observed. Then, the drive may return to the original operating point after a delay provided by the settling time. Hence, the minimum time preferable for one step of the tuning process may be established by the following:

$$t_D = t_E + 4 * t_M. \quad (7)$$

where $t_M$ is a time constant of the closed loop speed control system.

Moreover, during the drive transients, it is preferable to update the firing angles only if the settling time is larger than the electrical cycle time.

a. The minimum step size that can be chosen for the tuning algorithm is defined by the resolution of the position information. For an absolute position sensor with n bits, the resolution is $$\Delta \theta = 360° * \rho_R / 2^n. \quad (8)$$

If a small step size is utilized, the result of the optimization may be closer to the theoretical maximum. Still, the minimum error in the optimization may be limited by the resolution of the current measurements. If a large step size is used, the search will converge faster, but the speed ripple may not be acceptable.

b. During drive transients, only the lookup tables can be utilized to determine α and β. The lookup tables are indexed with current and speed. The step sizes ΔI and Δω in the table can be made as small as desired, depending on the memory available.

The self-tuning method and system according to the present invention provides a maximum TPA in the presence of parameter variation and drift, which alter the motor inductance profiles. One of the exemplary implementations of the system and method is a real-time implementation in a digital control system. The control scheme of the present invention can be applicable to any SRM drive operated with a shaft position sensor and does not depend on the number of phases, poles, or horsepower of the motor. This control scheme is also applicable to sensorless SRM drives, in which the shaft position information is indirectly derived.

II. Neural Network Based Self-Tuning Control of a Switched Reluctance Motor Drive to Maximize Torque Per Ampere Another embodiment of the present invention optimizes the drive performance as measured by torque per ampere. One embodiment of the method according to the present invention combines the ANN which uses control and heuristic search based on position and current feedback to constantly update the weights of the ANN in accordance with the parameter variations. Since the NN is trained based on the experimental data obtained from the self-tuning setup which includes the effect of saturation, it has a very good accuracy. In addition, it offers a good dynamic response and has an excellent self-learning capability.

A typical measured inductance profile, for the unsaturated case, of an exemplary SRM 0.5 HP, is shown in FIG. 2, in which 0° is the unaligned position and 180° is the aligned position measured in electrical degrees. Motoring torque in the SRM is produced when the phase winding is energized during the positive slope of the phase inductance variation. Preferably, the maximum is produced when the winding is energized with a rectangular pulse of maximum torque per ampere allowable current during this period. Due to the effects of the winding inductance, motional EMF and the magnetic saturation, the current has a definite rise and fall time. This introduces notable negative torque which should be taken into consideration for optimal performance of the SRM drive. In the low speed region (below base speed), with the current being limited by a chopping current controller, maximum torque per ampere can be obtained by tuning the turn-on angle α and the turn-off angle β of the phase current excitation.

The α is not very susceptible to the change in inductance due to the parameter variations because of the large air gap at the unaligned position. Hence optimal α calculated off-line based on the linear model will be sufficient enough to give the optimal torque per ampere. Therefore, the optimization problem reduces to calculation of β on-line that gives maximum torque per ampere. There exists a novel solution for β for each operating in the (ω,T) region.

Another exemplary embodiment of the method according to the present invention relates to a perceptron type ANN which calculates the optimal β on-line. The ANN topology of this embodiment has an optimal number of neurons with an input layer with, e.g., 2 inputs, 2 hidden layers with 6 neurons each and an output layer with a single output. The inputs are $I_{max}$ and ω, and the output is β back propagation learning procedure (which is known to those having ordinary skill in the art) can be used for training the ANN. The activation function of neurons, in the hidden layers, is provided by:

$$f(s) = \tanh(s + \text{bias}) \tag{9}$$

where s is the input to the current layer. The weights in the ANN is changed according to the rule:

$$\Delta w_{ij} = -k \frac{\partial E}{\partial w_{ij}} = \varepsilon \delta_{pi} a_{pj} \tag{10}$$

where ε is the learning rate, $A_{pi}$ are the output of the neurons. The determination of δ is a recursive process, starting from the output layer is defined as:

$$\delta_{pi} = (t_{pi} - a_{pi}) f_i'(\text{net}_{pi}) \tag{11}$$

where $\text{net}_{pi}$ are the input to the neurons from the previous layer given by $$\text{net}_{pi} = \sum_j w_{ij} a_{pj} + \text{bias}_i \tag{12}$$

and t represents the target function. The output layer utilizes a linear activation function. For the hidden layers, $\delta_{pi}$ is given by $$\delta_{pi} = (1 - f_i(\text{net}_{pi}))(1 + f_i(\text{net}_{pi})) \sum_k \delta_{pk} w_{ki} \tag{13}$$

where $f_i$ is the activation function defined by equation (3). The ANN is trained with the experimental data obtained from the self-tuning setup, and it includes the effect of the magnetic saturation. Hence the accuracy of the optimal $\theta_{off}$.

Figure 12:
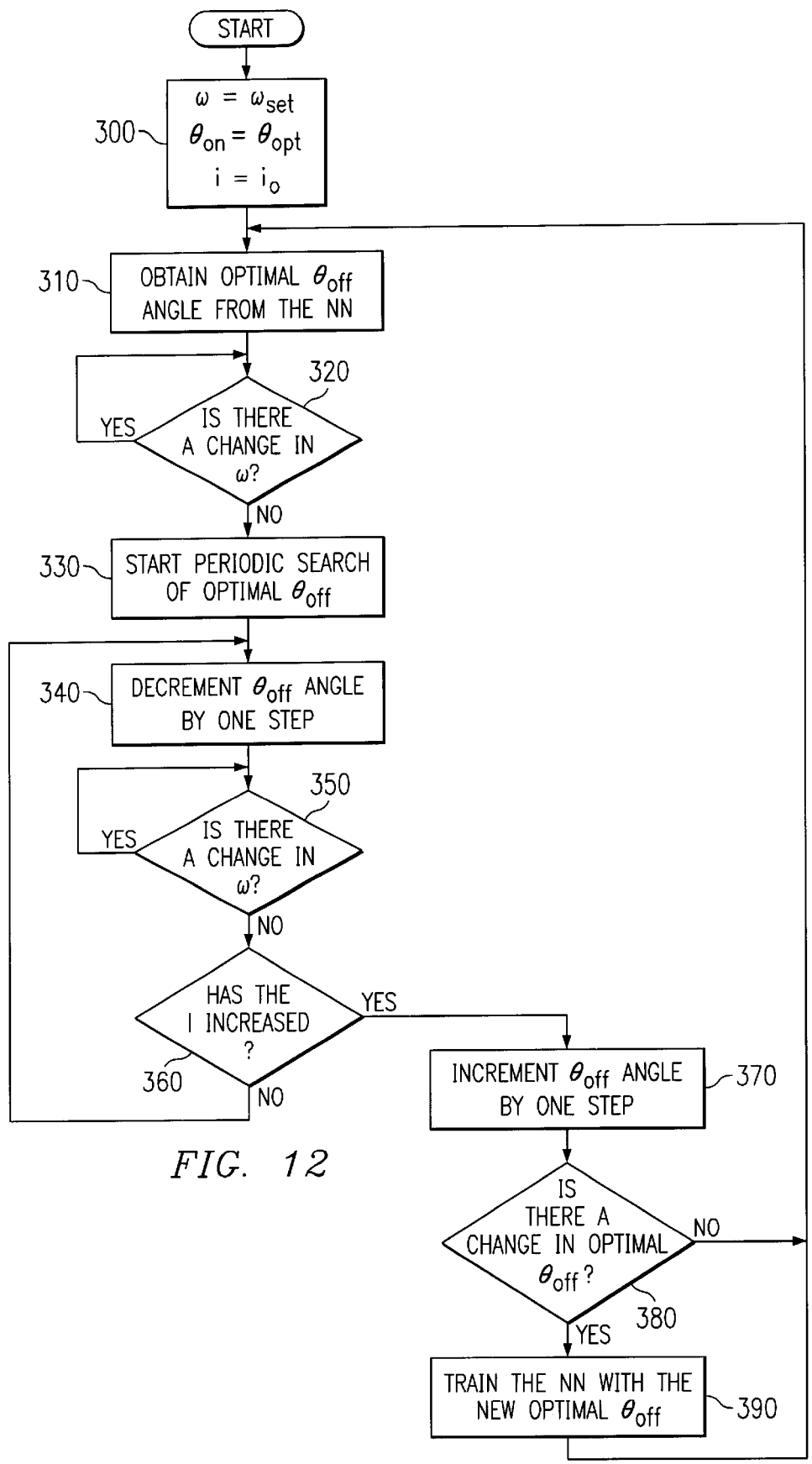
FIG. 12 is an exemplary flowchart of a neural network based method according to the present invention.

FIG. 12 shows a flowchart of the above described embodiment of the method according to the present invention. For example, in step 300, the velocity ω, the turn-on angle α and the current are initialized to predetermined values. α is set at the optimal value calculated off-line and β is set the maximum value of 180°. The current I is set to a value to obtain the desired torque. The system and/or method according to the present invention then obtains an optimal turn-off angle β from the neural network or artificial neutral network (step 310). If there is a change in the velocity ω (step 320), the system and/or method waits until there is no change in velocity. At such time, a periodic search of the optimal turn-off angle β is performed (step 330), and the value of the turn-off angle β is decremented by one step (step 340). Then, the system and/or method waits until there is no change in the velocity ω (step 350), and inquires if the current has been increased (step 360). If not, the procedure is returned to step 340. Otherwise, the turn-off angle β is incremented by one step (step 370), and it is again inquired if there is a change in the optical β. If not, the procedure is returned to step 310. Otherwise, the is trained with a new optimal turn-off angle β in step 390 and the procedure returns to step 310.

To summarize, the maximum torque per ampere can be obtained when the current I is minimum, with the speed (ω) and Torque (T) remaining constant. Once the drive reaches the steady state, the value of β is modified in steps until it reaches a minimum value. This process is repeated for various operating points to obtain an array of data at the low speed region of the (ω, T) plane. This optimal value of β is stored against the given operating point. Since the ANN directly provides the optimal turn-off angle β on-line, it has a very good dynamic response. Also, because the control is based on ANN, it is not restricted by a finite resolution problem as in the 'look-up table approach'.

Figure 13:
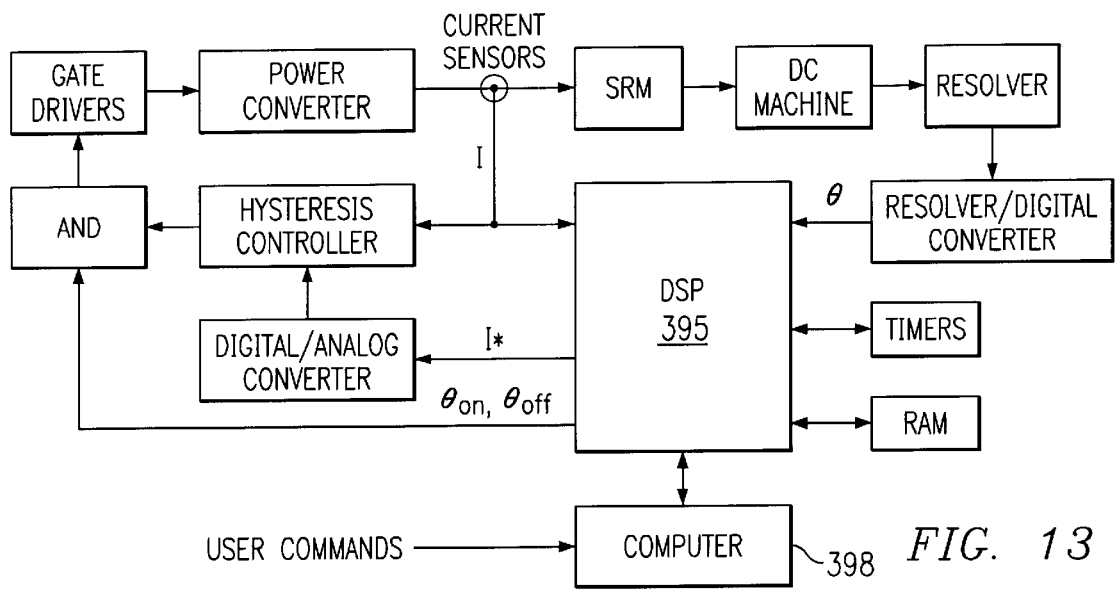
FIG. 13 is an exemplary system for a self-tuning SRM which uses an angle step of e.g., 1°.

A block diagram of an exemplary embodiment of the system which can execute the above described procedure is shown in FIG. 13. This embodiment shows a highly accurate, robust system which has a good dynamic response, and combines the ANN based control and a procedure of a periodic search for an optimal turn-off angle based on the position of the motor and the current feedback. The system has a self-learning capability as it tunes the weights of the ANN according to parameter variations that affect the inductance profile, and can be implemented digitally using, e.g., a digital signal processor 395 and/or a computer 398 (shown in FIG. 13).

Figure 14:
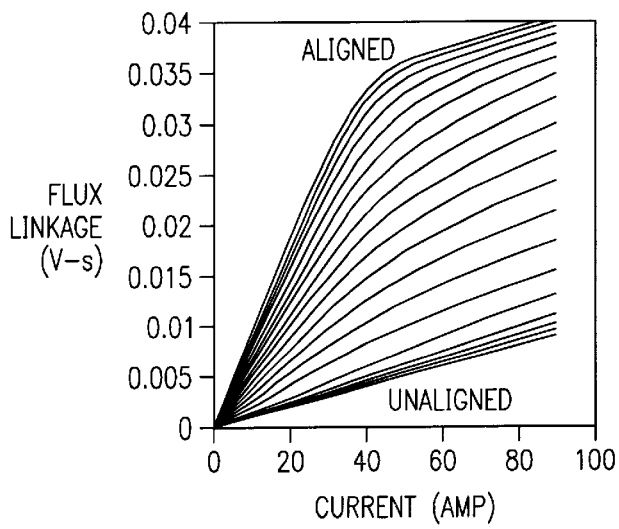
FIG. 14 is a variation of flux linkage with current.

III. A Neural Network Based Instantaneous Torque Control Scheme Of A Switched Reluctance Motor to Minimize Torque Ripple With Maximum Possible Torque Per Ampere One of the initial steps in modeling the non-linearities of the SRM is to predict the flux linkage (ψ) curves as a function of rotor position (θ) and motor phase current (i). Exemplary flux linkage curves of the SRMs are shown in FIG. 14 with respect to the motor current for different positions of the rotor. A rotor position can be arbitrarily chosen as zero when it is completely unaligned with the stator pole. In this position, most of the stator flux finds its way through the air. Hence, the resulting variation of the flux-linkages with current is almost linear. Whereas, for an exemplary angle θ=30°, the rotor may be completely aligned with the stator pole. Due to the highly permeable flux path through rotor pole, the fluxes cross the air gap mainly through the rotor pole to provide a saturated iron core. The general phase voltage equation of the SRM is given by $$V = Ri + \frac{d\psi(\theta, i)}{dt} \tag{14}$$

where V and R are applied voltage and phase winding resistance, respectively. For the equation (14), it is preferable to model the magnetic non-linearities of ψ(θ, i). The variation of the flux-linkage with the current may be the same for the remaining phases except for the angular dependence, which may take into account the physical interpolar spacing.

The SRM produces a torque on the basis of a reluctance variation along the magnetic circuit. In general, when a stator phase is energized, the stator pole pair attracts the closest rotor pole pair toward the alignment of the poles. The torque is produced by this tendency of the magnetic circuit to adopt a configuration of minimum reluctance, and it is independent of the direction of the current flow. By energizing the successive phases at the appropriate rotor positions, a continuous rotation in either direction is possible. The torque, in terms of the co-energy, is defined as:

$$T_{total}(\theta, i) = \sum_{phase} T_{phase}(\theta, i) = \sum_{phase} \frac{\partial}{\partial \theta} W'(\theta, i) \quad (15)$$

The co-energy can be calculated from the following equation:

$$W' = \int_0^i \psi(\theta, i) di \quad (16)$$

An embodiment of the system and method according to the present invention can utilize a conventional back propagation network. In addition, other neural networks can be utilized as can be understood by those having ordinary skill in the art. The first step in the neural network-based control is the network training. For example, an off-line dynamic simulation of the SRM provides the training data for the neural network. In order to include the magnetic non-linearity in the model, the dynamic model may use static magnetization data which may be collected experimentally.

Figure 15:
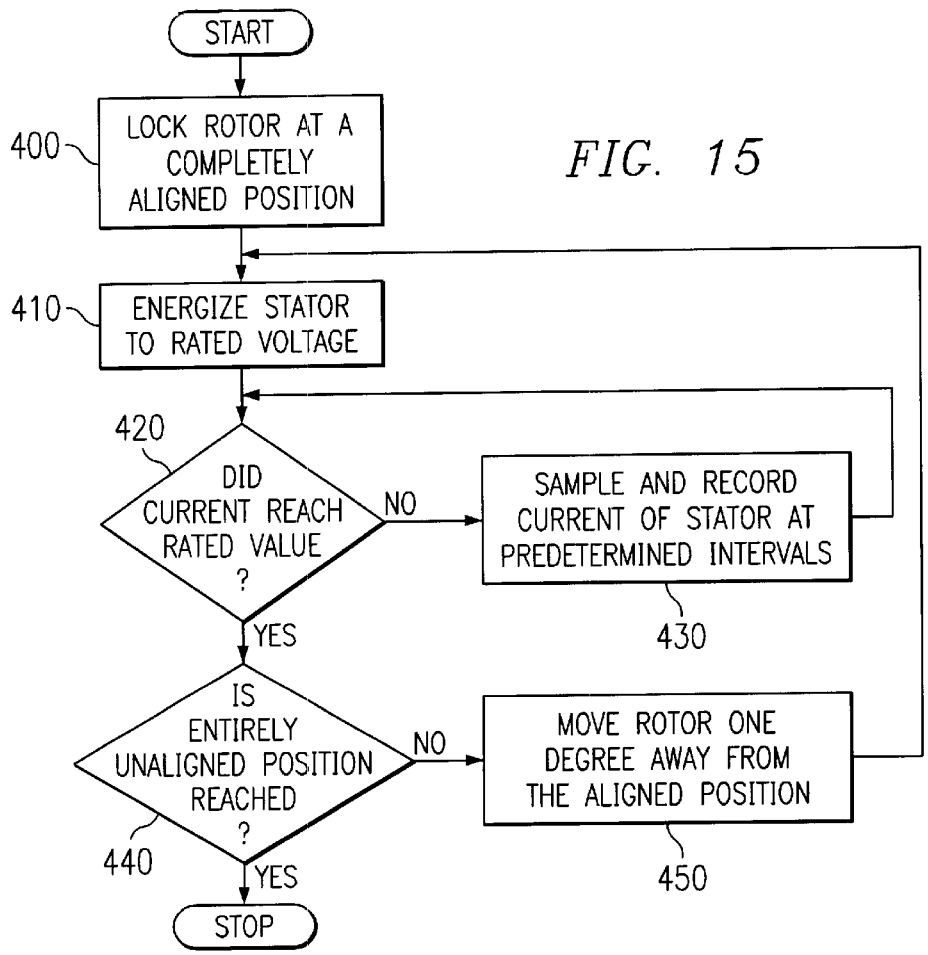
FIG. 15 is another embodiment of the method according to the present invention.
Figure 16:
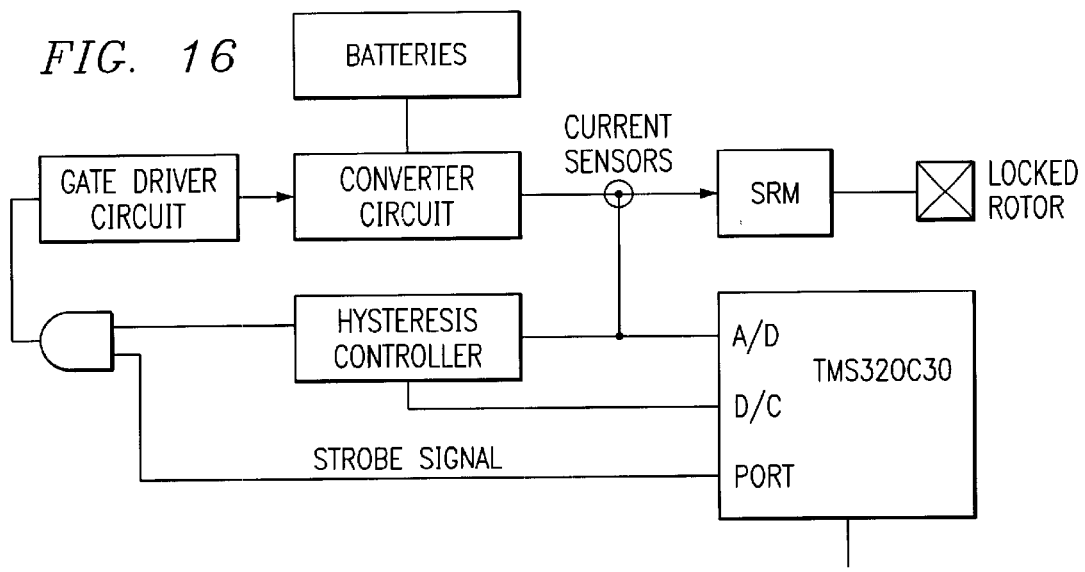
FIG. 16 is an exemplary digital signal processing system according to the present invention for storing sampled data.

In order to model the non-linearity of SRM, it is preferable to determine the flux-linkages as function of the stator current and rotor position. For this purpose, according to an embodiment of the method of the present invention shown in FIG. 15 first the rotor may be locked at the completely aligned position (step 400). The stator is then energized to the rated voltage (step 410), thus allowing the current to rise to the rated value. Once the current reaches the rated value the stator is de-energized (step 420). In the mean time, stator current is sampled at regular interval and recorded as a function of time (step 430). The above described procedure is repeated approximately at every one degree intervals until the entirely unaligned position is reached (steps 440–450). An exemplary system to perform this procedure is shown in FIG. 16.

The data obtained at one degree resolution may be inadequate to train the neural network to obtain a fairly accurate model. More data can be generated using, e.g., a cubic B-Spline interpolation of the experimental data. Using the equations (14), (15) and (16), flux linkages, co-energy, and electromagnetic torque can be calculated, respectively. The integration of equations (14) and (15) may be performed at constant rotor position angle θ, while the differentiation of equation (16) is performed at a constant current. The resulting T–θ=i and ψ–θ=i tables are used in the dynamic model of the SRM.

Figure 17:
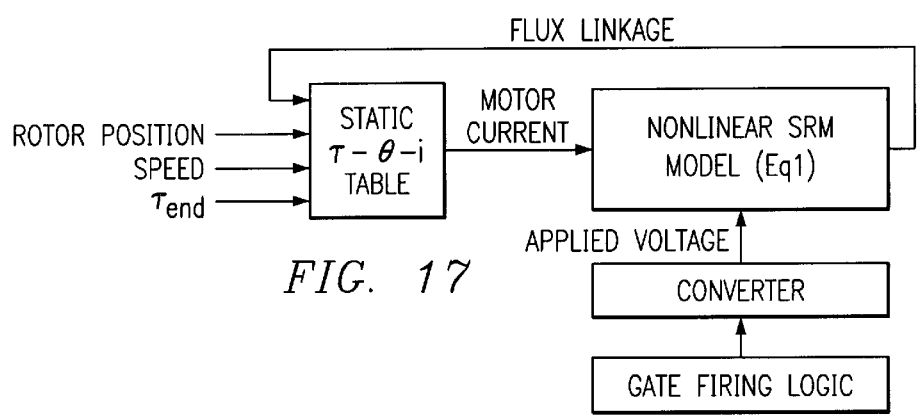
FIG. 17 is a block diagram of an exemplary embodiment of the dynamic SRM system according to the present invention.

Thus, a dynamic SRM model based on the static data is generated. A block diagram of an exemplary embodiment of the system which provides a dynamic model is shown in FIG. 17. The optimal current profile which produces minimum torque pulsation with maximum possible torque per ampere can be derived as a function of rotor position angle θ, commanded torque, and rotor speed from the dynamic model after a series of iterations.

IV. Neural Network Based Self-Tuning Control of a Switched Reluctance Motor Drive to Maximize Torque Per Ampere The exemplary embodiment of the self-tuning control procedure according to the present invention incorporates a heuristic search method along with an adaptive type NN based method.

In the closed loop speed control, the transfer function is approximated by $$T = kI^2 \quad (17)$$

where the current I is set to an appropriate value to obtain the desired torque. The maximum torque per ampere figure of merit can be obtained when the current I is minimum, with the speed (ω) and Torque (T) remaining constant. With this exemplary setup, the control variables for angles α and β can be varied to obtain the maximum torque per ampere figure of merit at the set speed and torque. Since the angle α is not very susceptible to parameter variations in the low speed region, its optimal value can be directly calculated from the linear model of the SRM. Thus, it is possible to determine the optimal turn-off angle $\theta_{off}$. In the heuristic search method, the controller may undergo the following steps to obtain the optimal β (as shown in FIG. 8):

1. First the β is initialized to maximum value of 180° as obtained in (step 100).
2. Then β is decremented in small steps of Δθ. The step size is chosen in such a way that there is a compromise between the speed of convergence and the accuracy.
3. After each step change in angle, the controller allows a small delay for the speed to settle down to the set value (step 120).
4. Now a comparison is made between the new current value with the previous value (step 140).
5. If the new current value is less than the previous value then the controller repeats changes the previous value to new current value (step 150) in step 2. Otherwise, it changes the sign of Δθ (step 160).
6. When the β is near an optimal value, the search will be localized to around 2 to 3 Δθ steps, in the neighborhood of the optimal β. The controller halts the search when the sign of Δθ changes for the second time (step 170).

The data to train the NN is obtained based on the above described heuristic search method. The drive is operated at some arbitrary operating point, and the tuning process is activated to find the optimal turn-off angle β. This process is repeated for various operating points to obtain an array of data in the low speed region of the (ω, T) plane. These operating points are appropriately chosen such that they are distributed in the entire low speed region. For each of these operating points, the optimal turn-off angle β is obtained. These optimal values of β may be stored with their given operating points, and the data obtained above are then used to train the NN.

The control method according to the present invention is based on a multilayer feed-forward NN with a differentiable type threshold function. The NN topology has an optimal number of neurons with an input layer with 2 inputs, 1 hidden layer with 6 neurons and an output layer with a single output which calculates the optimal β on-line. The inputs are I and ω and the output being optimal turn-off angle β. The back propagation learning algorithm can be utilized for training the NN. The activation function of neurons in the hidden layers is chosen to be a tan-hyperbolic function as defined as:

$$f(s_j) = \tan h(s_j) = t_j \quad (18)$$

and $$s_j = b_j + \sum_{i=1}^{n} x_i w_{ij} \quad (19)$$

where s is the input to the current layer, t is the output of the current layer, i is the index of the previous layer, j is the index of the current layer, n is the number of neurons in the current layer, $w_{ij}$ is the weight matrix between the current and previous layers, and $b_i$ is the bias for the current layer.

The intermediate weight correction term for the weight matrix between the output layer and its previous layer is obtained from:

$$\delta = ef'(t_j) \quad (20)$$

where $t_i$ is the input to the previous layer and e is the error term obtained as:

$$e = y - t \quad (21)$$

where y is the desired optimal β, and t is the calculated β from the NN output. For all other layers, the intermediate weight correction term can be calculated as:

$$\delta_j = f'(t_j) \left( \sum_{K=1}^{m} \delta_k W_{jk} \right) \quad (22)$$

where k is the index of the next layer and m is number of neurons in the next layer and f' ($t_j$) is defined as:

$$f'(t_j) = (1 - f(t_j))(1 + f(t_j)) \quad (23)$$

The weight correction term is calculated as:

$$\Delta W_{ij} = \epsilon \delta_j t_i \quad (24)$$

where ε is the learning rate. The bias correction term is calculated as:

$$\Delta b_j = \epsilon \delta_j \quad (25)$$

Finally, the weights and biases are updated as:

$$W_{ij}^{new} = W_{ij}^{old} + \Delta W_{ij} \quad (26)$$

and $$b_j^{new} = b_j^{old} + \Delta b_j \quad (27)$$

As the NN is trained with the data obtained from the self-tuning setup, it may include the effect of magnetic saturation. Hence, the accuracy of the optimal turn-off angle β obtained from the NN is quite high.

The control method and system according to the present invention as described above incorporates a periodic heuristic search of optimal β to verify the accuracy of the turn-off angle β obtained from the NN. If there is a variation in the inductance profile due to parameter drift, the optimal turn-off angle β obtained from the NN will no longer apply. This prompts the controller to activate the heuristic search by modifying the turn-off angle β in small steps until the current I reaches the minimum value. This new optimal turn-off angle β at that particular operating point is used to adapt the weights of the NN. Hence, the above described NN based control method according to the present invention coupled with the heuristic search learns and adapts to any parameter drift to give the optimal turn-off angle β. The method followed in adapting the weights of the NN is discussed in further detail below.

Since, the NN directly provides the optimal turn-off angle β on-line, it has a very good dynamic response that is limited only by the speed of the DSP and the size of the NN. Also, since the control is based on NN, it is not restricted by a finite resolution problem as in the 'look-up table approach'. When new training data is obtained, the previously trained NN is used to generate additional examples. These additional examples, with the newly obtained training data, are then used to retrain the current NN. This ensures that the original NN mapping is retained with, e.g., only a change localized around the neighborhood of the new training data. This makes the NN gradually adapt to the new data. The above described method according to the present invention ensures the stability of the network weight variations by slow adaptation as the new optimal turn-off angle β can be in the neighborhood of the old value.

The method and system according to the present invention adaptively provides a high accuracy when the parameter variations are slow with time. The network can be trained with linear model data and allowing the NN controller to adapt itself during actual operation of the machine. The accuracy of the output of the NN may depend on the amount of new data used during adaptive training. The time required for adaptive training depends on the accuracy required. The controller can operate with the previous set of optimal turn-off angles β until the adaptive training is completed. The criterion to include the new data for adaptive training should take into consideration the tolerance in the output of the NN.

One of the main advantages of the method and system according to the present invention is that the they can be very flexible and thus can be used for self-tuning to optimize any of the performance indices (e.g., the figure of merit) like efficiency, torque ripple, etc.

It should be appreciated that those skilled in the art will be able to devise numerous systems and processes which, although not explicitly shown or described herein, embody the principles of the invention, and are thus within the spirit and scope of the present invention.

What is claimed is:

1. A method for controlling a switched-reluctance motor, comprising the steps of:
   selecting a control variable for controlling a figure of merit of the motor;
   operating the motor at a first value of the control variable;
   adjusting the control variable to a second value;
   operating the motor at the second value of the control variable;
   comparing a first indicator indicative of the figure of merit of the motor operating at the first value of the control variable to a second indicator indicative of the figure of merit of the motor operating at the second value of the control variable; and
   selecting a new value as the first value of the control variable in response to the comparison of the first indicator to the second indicator.

2. The method of claim 1, wherein the comparing step comprises the substep control variable.

3. The method of claim 1, wherein the adjusting step comprises the substep of adjusting the value of the control variable to an adjusted value while the motor is operating.

4. The method of claim 1, wherein the selecting step comprises the substep of selecting a control variable as at least one of a turn-on time variable of a current received by the motor, a turn-off time variable of the current, and an instantaneous magnitude variable of the current.

5. The method of claim 1, wherein the figure of merit is the indicative value of torque per ampere of the motor.

6. The method of claim 1, wherein the figure of merit is the indicative value of drive efficiency of the motor.

7. The method of claim 1, wherein the figure of merit is the indicative value of torque pulsation of the motor.

8. The method of claim 1, wherein the figure of merit is the indicative value of noise level of the motor.

9. The method of claim 1, wherein the adjusting step comprises the substep of adjusting a turn-on time of a current received by the motor.

10. The method of claim 1, wherein the adjusting step comprises the substep of adjusting a turn-off time of a current received by the motor.

11. The method of claim 1, wherein the adjusting step comprises the substep of adjusting an instantaneous magnitude of a current received by the motor.

12. The method of claim 1, further comprising the step of:
iteratively repeating the adjusting step until the figure of merit reaches an approximate optimum level.

13. The method of claim 12, wherein the repeating step comprises the substep of incrementing the control variable until the figure of merit reaches the optimum level.

14. The method of claim 12, wherein the repeating step comprises the substep of decrementing the control variable until the figure of merit reaches the optimum level.

15. The method of claim 1, wherein the operating step comprises the substep of operating the motor at the first value of a control variable which is stored in a database, the stored first value being associated with the motor.

16. The method of claim 15, further comprising the step of:
generating a database of control variables via a neural network.

17. The method of claim 1, wherein the selecting step comprises the substep of incrementing the control variable if the first indicator exceeds the second indicator.

18. The method of claim 1, wherein the selecting step comprises the substep of decrementing the control variable if the first indicator exceeds the second indicator.

19. The method of claim 1, wherein the adjusting step comprises the substep of adjusting a shape of a current waveform received by the motor.

20. A method for controlling a switched-reluctance motor, the switched-reluctance motor receiving a current during at least a portion of a time that the motor is operating, the method comprising the steps of:
selecting a control variable for controlling the indicative value of torque per ampere of the motor, the control variable being selected from at least one of a turn-on time value of the current and a turn-off time value of the current;
operating the motor at a first value of the control variable;
adjusting, while the motor is operating, the control variable to a second value;
comparing a first instantaneous indicator of the current when the motor is operating at the first value of the control variable to a second instantaneous indicator of the current when the motor is operating at the second value of the control variable; and
selecting a new value as the first value of the control variable in response to the comparing step.

21. A method for controlling a motor, comprising the steps of:
selecting at least one control variable for controlling at least one figure of merit of the motor;
operating the motor at a first set of values for the at least one control variable;
adjusting, while the motor is operating, the first set of values of the at least one control variable to a second set of values of the at least one control variable;
comparing a first set of indicators indicative of the at least one figure of merit of the motor operating at the first set of values of the at least one control variable to a second set of indicators indicative of the at least one figure of merit of the motor operating at the adjusted value of the at least one control variable; and
selecting a new set of values as the first set of values of the at least one control variable in response to the comparing step.

22. A method for tuning a motor, comprising the steps of:
determining if a steady state of the motor is achieved;
if the steady state of the motor is achieved, fixing at least one input to the motor at a first value;
selecting at least one phase of the motor to be tuned;
varying the at least one input for the at least one selected phase to a second value;
comparing the first value to the second value; and tuning the motor based on the comparison.

23. A system for controlling a switched-reluctance motor, comprising:
a control arrangement which:
selects a control variable for controlling a figure of merit of the motor,
operates the motor at a first value of the control variable,
adjusts the control variable to a second value,
operates the motor at the second value of the control variable,
compares a first indicator indicative of the figure of merit of the motor operating at the first value of the control variable to a second indicator indicative of the figure of merit of the motor operating at the second value of the control variable, and
selects a new value as the first value of the control variable in response to the comparison of the first indicator first to the second indicator.

24. A method for controlling a motor, comprising:
operating the motor at a first value of a control variable, the control variable for controlling a performance index of the motor;
adjusting the control variable to a second value, wherein the second value is the sum of a step value and the first value;
operating the motor at the second value of the control variable;
comparing a first indicator indicative of the performance index of the motor operating at the first value of the control variable to a second indicator indicative of the performance index of the motor operating at the second value of the control variable;
in response to comparing the first indicator to the second indicator, determining that the second value improves the performance index; and
in response to determining that the second value improves the performance index, adjusting the control variable to a third value, wherein the third value is the sum of the step value and the second value.

* * * * *